United States Patent [19]
Dooley et al.

[11] 4,305,531
[45] Dec. 15, 1981

[54] PNEUMATICALLY OPERATED CONTROLLED VOLUME DISPENSING DEVICE

[76] Inventors: Dan W. Dooley, 6182 SW. Dawn St.; Robert T. Bromps, 6235 Edgewood, both of Lake Oswego, Oreg. 97034

[21] Appl. No.: 89,495

[22] Filed: Oct. 30, 1979

Related U.S. Application Data

[63] Continuation-in-part of Ser. No. 944,384, Sep. 21, 1978.

[51] Int. Cl.³ ............................................. G01F 11/04
[52] U.S. Cl. .................................. 222/334; 222/361; 222/389
[58] Field of Search ........ 222/249, 250, 334, 361–362, 222/355, 359, 261, 263, 389, 288; 184/39, 42, 7 D, 7 E

[56] References Cited

U.S. PATENT DOCUMENTS

| | | | |
|---|---|---|---|
| 2,143,733 | 1/1939 | Hillis | 184/7 E |
| 3,797,709 | 3/1974 | Ivanovich | 222/334 |
| 4,006,847 | 2/1977 | Dooley | 222/334 |

FOREIGN PATENT DOCUMENTS 1113288  3/1956  France .............................. 222/361

*Primary Examiner*—H. Grant Skaggs
*Attorney, Agent, or Firm*—Chernoff & Vilhauer

[57] ABSTRACT

A dispensing apparatus for dispensing viscous substances includes a cylinder encompassing a sliding sleeve which in turn receives a free sliding dispensing piston. Material to be dispensed is supplied to the sleeve under pressure. Air pressure is applied to the piston through the use of a three-way, two-position air valve, causing the sleeve to shift, thereby closing a supply port and opening a dispensing port in the apparatus and causing the dispensing piston to discharge material through the dispensing port.

2 Claims, 2 Drawing Figures

U.S. Patent   Dec. 15, 1981   4,305,531
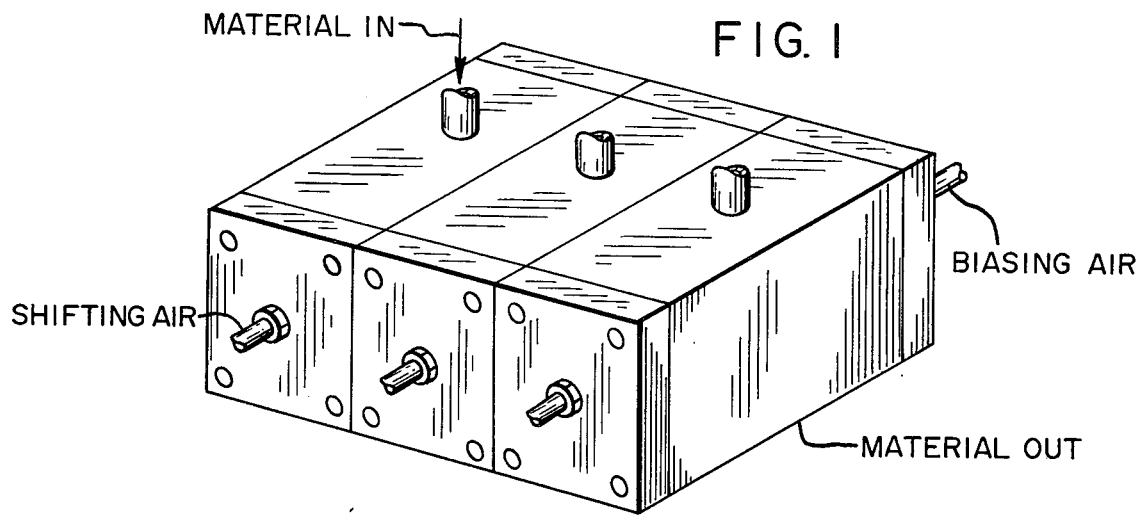
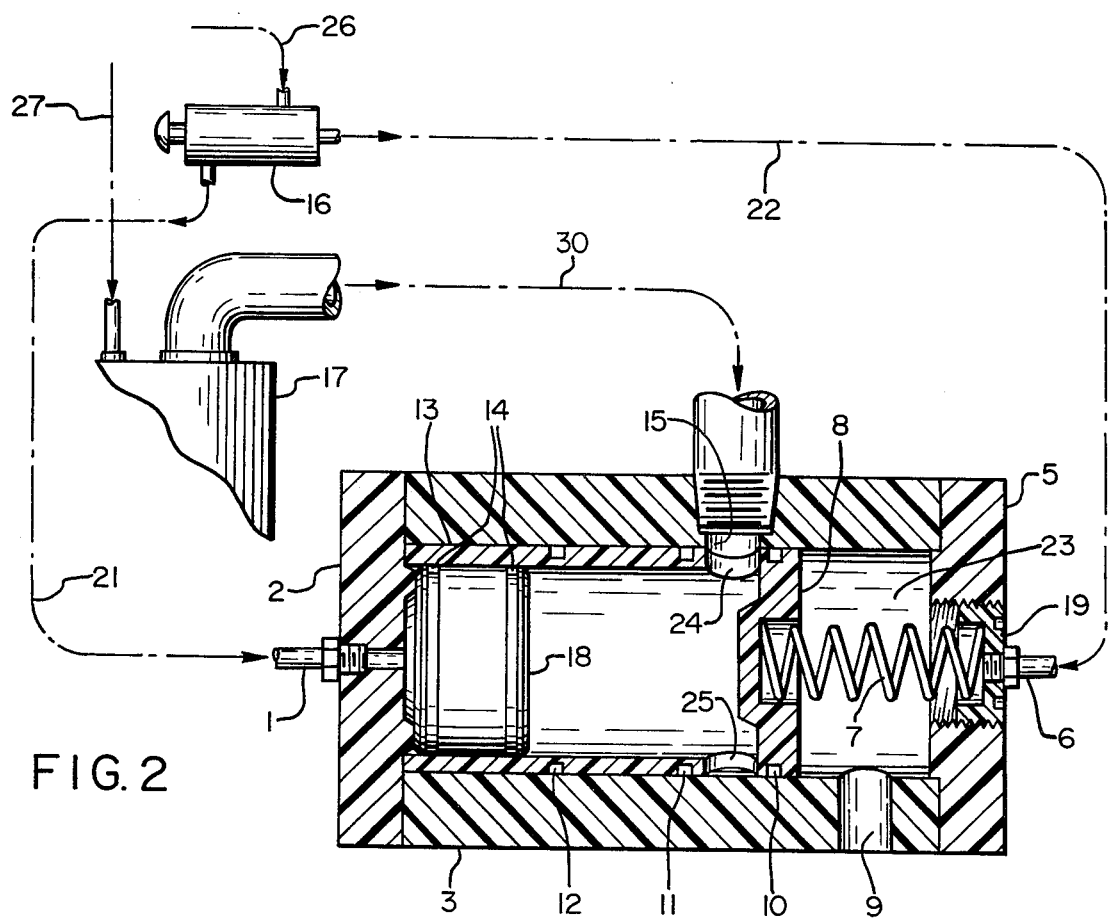

4,305,531

PNEUMATICALLY OPERATED CONTROLLED VOLUME DISPENSING DEVICE

RELATED APPLICATIONS

This application is a continuation-in-part of Ser. No. 944,384, filed Sept. 21, 1978.

BACKGROUND OF THE INVENTION

Conventional dispensing systems for liquids generally comprise a pressurized supply and a dispensing valve which is open for a predetermined period of time such that a predetermined quantity of liquid is delivered therethrough. While systems of this type are suitable for many purposes, they are not entirely suitable for viscous substance such as syrup, custards, jellies or materials which contain semi-solid elements. The quantity of substance which may flow in a given time may vary, and shut off of the dispensing valve may be difficult.

In prior U.S. Pat. Nos. 3,734,352 and 4,006,847 by Dooley, dispensing systems are disclosed and claimed including a pilot operated spool valve for controlling the dispensing cylinder in one case, and manually operated spool valve for controlling a differential pressure operated dispensing cylinder in the other case. These systems are effective in solving the problems associated with viscous substances in that positive displacement of a definite quantity of material is provided together with quick severing of semi-solid elements in the dispensed material through action of the spool valve.

The present invention comprises additional improvements in this general type of apparatus wherein the entire apparatus is simplified from the standpoints of design, manufacture and installation.

SUMMARY OF THE INVENTION

The present invention dispensing apparatus includes a cylinder containing a floating sleeve with a dispensing piston slidably fitting within. The cylinder and the sleeve each has an inlet or supply port, and an outlet, or discharge port. The sleeve in the dispensing piston is actuated through the use of a source of compressed air directed through a three-way, two-position air valve. A source of compressed air is also used to convey the material to be dispensed into the sleeve.

It will be appreciated that this dispensing apparatus can be made from a variety of materials, such as many of the presently available plastics, or metals, such as stainless steel, steel or aluminum.

It will also be appreciated that this dispensing apparatus can be made in any general outside configuration, or any desirable size.

It is therefore an object of the present invention to provide an improved dispensing apparatus for dispensing a predetermined quantity of a viscous or nonuniform substance such as pickle relish, salad dressing, sundae toppings and other such materials.

It is a further object of the present invention to provide an improved dispensing apparatus for dispensing a predetermined quantity of a viscous or nonuniform substance, wherein the discharge outlet of the dispensing valve is automatically cleared to prevent afterdrip of the material being dispensed.

It is a further object of the present invention to provide an improved dispensing apparatus for dispensing a predetermined quantity of a viscous or nonuniform substance, wherein the dispensing apparatus may be operated through the use of any convenient medium such as compressed air, nitrogen, carbon dioxide or water.

The subject matter we regard as our invention is particularly pointed out and distinctly claimed in the concluding portion of this specification. The invention, however, both as to organization and method operation, together with further advantages and objects thereof, may best be understood by reference to the following description taken in connection with the accompanying drawings, wherein like referenced characters refer to like elements.

BRIEF DESCRIPTION OF THE DRAWINGS

FIG. 1 is a perspective view of a plurality of dispensing units according to the present invention.

FIG. 2 is a vertical sectional view of a dispensing apparatus according to the present invention.

DETAILED DESCRIPTION OF A PREFERRED EMBODIMENT

Referring to the drawings and particularly to FIG. 1 a plurality of dispensing units in perspective view is shown indicating the practicality of installation in close proximity with one another. The dispensing apparatus may then be held in place by the most convenient available means, such as mounting bolts, drip pins, encompassing brackets or other such means as may be practical.

Referring to the drawings and particularly to FIG. 2 illustrating the dispensing apparatus in detail, a body 3 is provided with a transverse bore forming a cylindrical cavity 21 and defines fluid inlet and outlet ports 15 and 9.

A tubular sleeve 13, provided with sleeve ports 24 and 25 strategically located to align alternately with fluid inlet port 15 and outlet port 9, and annular grooves 10, 11 and 12 for the purpose of receiving seals which may be comprised of "O" rings, continuous gaskets, or the like, and a cap 8, held in place with pins (not shown) slidably communicates with the cavity 23.

A piston 18, provided with annular grooves 14 for the purpose of receiving seals which may be comprised of "O" rings, "U" cups, continuous gaskets or the like, is dimensioned for free sliding movement within the tubular sleeve.

Piston 18 with seals properly installed is inserted into the bore of the tubular sleeve 13 which, with seals properly installed, is in turn installed in cavity 23 of body 3.

A first head piece 2 is attached to a first end of the body 3, and secured with pins (not shown), and a second head piece 5 is installed on the other end of the body and likewise secured. A first air passageway 1 passes medially through the first head piece, and a second air passageway 6 passes medially through the second head piece 5.

A biasing spring 7 is located with one end placed in an area provided in a cap 18 which encloses one end of sleeve 13. The other end of the biasing spring 7 is secured in an area provided in the second head piece 5. Adjustment means 19 allow the force exerted by the biasing spring to be varied.

A fluid tank 17 is connected to the dispensing apparatus at fluid inlet port 15 by a fluid conduit 19. A source of compressed air or other compressed gas, such as nitrogen or carbon dioxide, is, by gas supply means 27, supplied to tank 17 to force the material to be dispensed through fluid conduit 30 to the dispensing apparatus.

A pushbutton operated three-way gas supply valve 16 is connected to the dispensing apparatus by tubular conduit means 21 at first air passageway 1 in first head piece 2, and by tubular conduit means 22 at second gas passageway 6 of second head piece 5. The three-way gas supply valve 16 is supplied with a source of compressed air, or other compressed gas, through a tubular conduit 26.

Referring to the drawings, and particularly to FIG. 2, operation of a dispensing apparatus according to the present invention is as follows. With the three-way valve in a first position where conduits 21, 22 and 26 are isolated from one another, supply tank 17 is filled with the viscous or semi-solid bulk material to be dispensed. Compressed air supplied from tank 17 causes the material to flow through fluid conduit 30 through fluid inlet port 15 and sleeve port 24 into sleeve 13 filling the sleeve with the material. The pressure of the material to be dispensed is balanced against the pressure of biasing spring 7 by regulating adjustment means 19 so that the sleeve remains in a loaded position, against the first head piece, while being filled with the material.

The three-way air valve 15 is then shifted from its first position to a second position where compressed air from the tubular conduit 26 is routed through the air valve 16, the tubular conduit 21, and through first gas passageway 1 in first head piece 2 of the dispensing apparatus. The compressed air applies force against the face of piston 18 causing sleeve 13 to shift from its loaded position. As sleeve 13 shifts from its loaded position to an exhausting position, where cap 8 rests against second head piece 5, fluid inlet port 15 is closed, thereby preventing any further flow of material to be dispensed into the dispensing apparatus. Seals in annular grooves 10, 11 and 12 prevent leakage of material past the sleeve 13 and prevent compressed air from entering the materials to be dispensed. As sleeve 13 approaches the exhausting position, sleeve port 25 in sleeve 13 is aligned with the fluid outlet port 9 in body 3 of the dispensing apparatus. The force of the compressed air against the face of the piston then causes piston 18 to move to its second position thereby forcing the material out of the sleeve 13 through sleeve port 25 and fluid outlet port 9.

When the three-way valve 16 is returned to its first position, the compressed air in the sleeve is exhausted through first gas passageway 1, conduit 21, three-way valve 16, conduit 22 and into second gas passageway 6 in second head piece 5 thereby assisting biasing spring 7 in returning the sleeve to its loaded position. The compressed air is then exhausted to atmosphere through fluid outlet port 9 thereby clearing the port of any residual material.

When the sleeve 13 is returned to its loading position, material to be dispensed is again allowed to flow from tank 17 through fluid conduit 30, fluid inlet port 15 and sleeve port 24 thereby forcing piston 18 to the left, in FIG. 1, again filling the sleeve 13 with fluid and readying the dispensing apparatus for subsequent dispensing cycles.

While we have shown and described preferred embodiments of an invention, it will be apparent to those skilled in the art that many changes and modifications may be made without departing from our invention in its broader aspects. We therefore intend the appended claims to cover all such changes and modifications within the true spirit of our invention.

What is claimed is:

1. A dispensing apparatus for dispensing fluid material comprising:
    (a) a body having a cylindrical cavity defined therein;
    (b) a first head piece attached to said body and covering said cavity at one end thereof;
    (c) a second head piece attached to said body and covering said cavity at the other end thereof;
    (d) tubular sleeve means having an outside diameter arranged for sliding communication within said cavity and a length less than the length of said cavity, said sleeve having a cap attached to the end thereof facing said second head piece of said body;
    (e) biasing means for urging said sleeve to a loading position wherein it is in contact with said first head piece;
    (f) a piston dimensioned for free sliding movement within said tubular sleeve;
    (g) said body defining a fluid inlet port entering into said cavity at a location which lies on the side of said cap toward said first head piece when said sleeve is in its loading position;
    (h) said body defining a fluid outlet port entering into said cavity at a location proximate said second head piece;
    (i) said sleeve defining sleeve ports, at least one of said sleeve ports being in alignment with said fluid inlet port when said sleeve is in its loading position, and at least one of said sleeve ports being in alignment with said fluid outlet port when said sleeve is in an exhausting position, wherein said cap is adjacent to said second head piece;
    (j) said first head piece defining a first air passageway which passes therethrough; and
    (k) said second head piece defining a second air passageway which passes therethrough.

2. The dispensing apparatus of claim 1 wherein said biasing means includes means for selectively varying the amount of biasing force exerted by said biasing means.

* * * * *